United States Patent

Schroeder et al.

[11] Patent Number: 6,102,787
[45] Date of Patent: Aug. 15, 2000

[54] OSCILLATING COMBINATION BELT, SPINDLE AND EDGE SANDER

[75] Inventors: James D. Schroeder, St. Peters; David Davis, Overland; Kiyoshi Hoshino, Chesterfield, all of Mo.

[73] Assignee: Emerson Electric Co., St. Louis, Mo.

[21] Appl. No.: 09/010,231

[22] Filed: Jan. 21, 1998

Related U.S. Application Data

[63] Continuation-in-part of application No. 08/631,822, Apr. 10, 1996, Pat. No. 5,916,014, which is a continuation-in-part of application No. 08/233,278, Apr. 26, 1994, Pat. No. 5,549,507.

[51] Int. Cl.⁷ .............................. B24B 21/00; B24B 21/22
[52] U.S. Cl. ......................... 451/304; 451/451; 451/155
[58] Field of Search ................................. 451/304, 296, 451/311, 65, 155, 451, 414

[56] References Cited

U.S. PATENT DOCUMENTS

| | | | |
|---|---|---|---|
| 1,189,795 | 7/1916 | Mattison | 451/304 |
| 1,286,560 | 12/1918 | Doctor, Sr. | 451/296 |
| 1,628,531 | 5/1927 | Carlson | 451/304 |
| 1,662,137 | 3/1928 | Summers . | |
| 1,849,868 | 3/1932 | Einstein . | |
| 2,105,762 | 1/1938 | Zimmerman . | |
| 2,114,343 | 4/1938 | Gideon . | |
| 2,242,781 | 5/1941 | Gideon . | |
| 2,252,176 | 8/1941 | Harris, Jr. . | |
| 2,323,433 | 7/1943 | Whittaker . | |
| 2,416,493 | 2/1947 | Newton | 451/296 |
| 2,426,028 | 8/1947 | Krueger . | |
| 2,484,471 | 10/1949 | Shinn . | |
| 2,521,900 | 9/1950 | Clark . | |
| 2,926,465 | 3/1960 | Sommers | 451/304 |
| 2,979,962 | 4/1961 | Nindel . | |
| 3,037,328 | 6/1962 | Kaveny et al. . | |
| 3,868,791 | 3/1975 | Burns | 51/34 J |
| 3,886,789 | 6/1975 | Brookfield | 73/59 |
| 4,397,055 | 8/1983 | Cuchiara . | |
| 4,529,044 | 7/1985 | Klueber et al. . | |
| 4,926,602 | 5/1990 | Crouch | 451/296 |
| 4,939,870 | 7/1990 | Wang | 451/304 |
| 5,042,202 | 8/1991 | Klein et al. . | |
| 5,402,604 | 4/1995 | Hashii et al. | 451/155 |
| 5,476,409 | 12/1995 | Wada et al. | 451/296 |

FOREIGN PATENT DOCUMENTS

| | | | |
|---|---|---|---|
| 561026 | 1/1959 | Italy | 451/296 |
| 220086 | 4/1959 | U.S.S.R. | 323/51 |
| 022827 | 7/1909 | United Kingdom | 451/296 |

OTHER PUBLICATIONS

Krier, Bill, "Oscillating Spindle Sanders under $700.00," Word Magazine, Sep. 1994, pp.78–82.
Model No. 140 Owner's Manual, Clayton Machine Corp., 1–1991 Publication No. 912450, pp. 1017.

*Primary Examiner*—Robert A. Rose

[57] ABSTRACT

A sanding apparatus is disclosed which includes a motor and mechanical drive system for imparting rotational and oscillator motion to an output shaft thereof. The motor shaft extends upwardly through a worktable. In one embodiment, the sanding apparatus is convertible between two or more modes of operation. In a spindle sanding mode, a sanding spindle is coupled to the motor output shaft, such that the spindle rotates and oscillates with respect to the worktable. In a belt sanding mode of operation, a belt sanding belt/pulley assembly is attached to the motor shaft. The belt/pulley assembly includes a drive drum and a driven drum about which a sanding belt is entwined. When operated in belt sanding mode, the entire belt/pulley assembly, including the drive drum and the driven drum oscillate up and down with respect to the worktable. In an edge sanding mode of operation, the worktable is articulated so that at least a portion thereof is angularly adjustable with respect to the belt/pulley system.

11 Claims, 18 Drawing Sheets

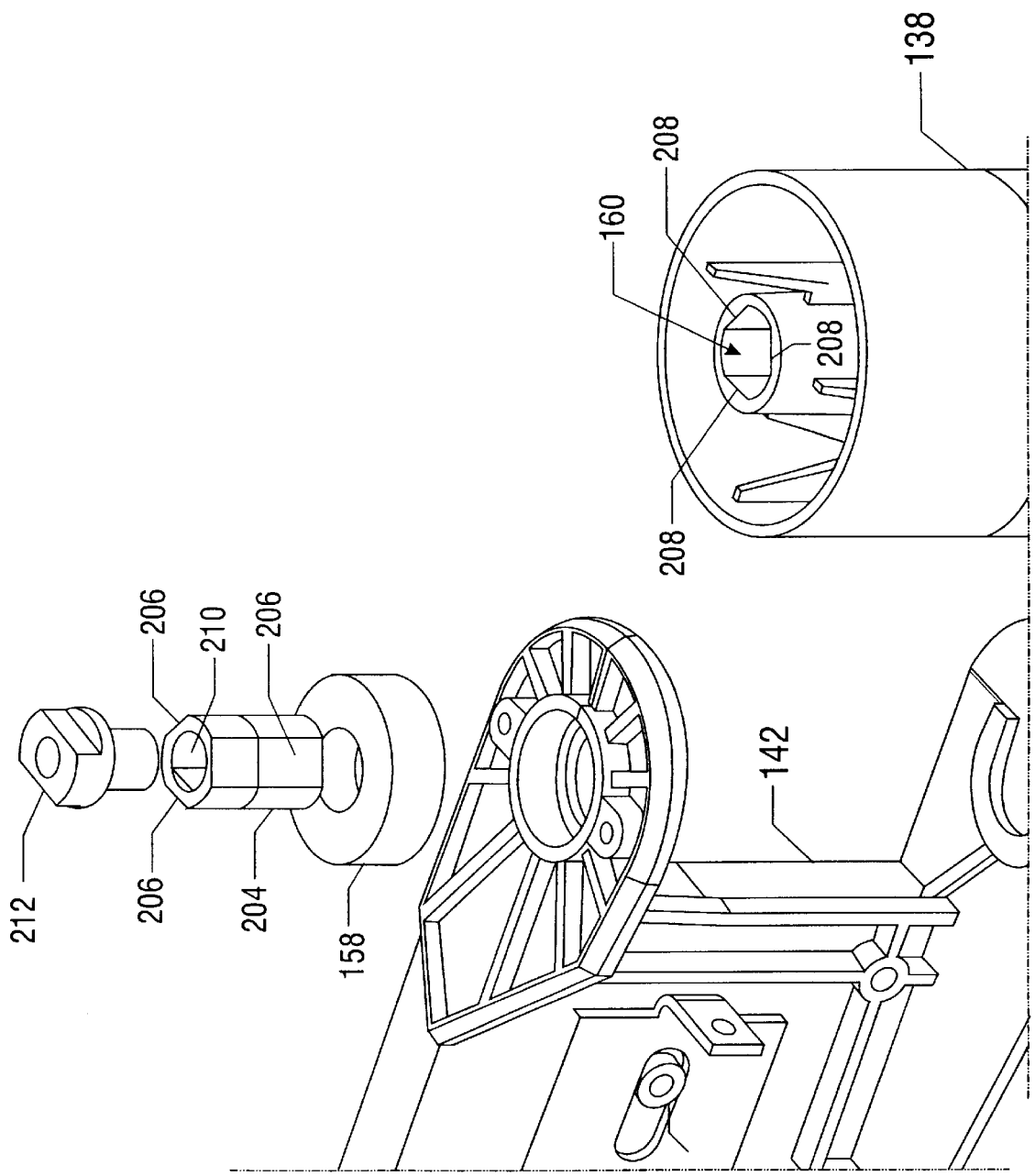

6,102,787

OSCILLATING COMBINATION BELT, SPINDLE AND EDGE SANDER

RELATED APPLICATIONS

This application is a continuation-in-part of prior U.S. patent application Ser. No. 08/631,822 ("the '822 application") filed on Apr. 10, 1996, now U.S. Pat. No. 5,916,014, which was a continuation-in-part of U.S. patent application Ser. No. 08/233,278, filed on Apr. 26, 1994, now U.S. Pat. No. 5,549,507, ("the 507 patent") all being commonly assigned to the assignee of the present invention.

FIELD OF THE INVENTION

This invention relates generally to the field of woodworking equipment, and more particularly relates to a sanding apparatus.

BACKGROUND OF THE INVENTION

The above-referenced '822 application and '507 patent, both of which being incorporated by reference herein in their respective entireties, disclose embodiments of an oscillating sander having a combined motor and mechanical drive for transmitting rotational and reciprocating motion to an output motor shaft. The output motor shaft extends upward through a worktable, and in one embodiment is adapted to accept a drum-sander-type sanding spindle assembly thereon. When the sanding spindle assembly is coupled to said output motor shaft and the motor and mechanical drive system is turned on, the sanding spindle assembly rotates and reciprocates (oscillates) up and down with respect to said worktable. This is referred to as the spindle sanding mode of operation of the sander.

In the '822 application, there is disclosed an additional feature of the sander, namely that it is constructed to facilitate conversion of the apparatus between a oscillating spindle sander and an oscillating belt sander.

When the sander disclosed in the '822 application and '507 patent is operated in spindle sander mode, a spindle sander assembly is attached to the output motor shaft, which reciprocates or oscillates up and down at a speed slower than it rotates. The dual rotary and oscillatory movement allows the sanding spindle to very efficiently remove material from a workpiece, without creating scratch patterns characteristic of conventional, i.e., non-oscillating, drum sanders.

When the sander disclosed in the '822 application is operated in belt sander mode, a belt/pulley system is attached to the output motor shaft. The belt/pulley system includes a drive drum and a driven drum about which a sanding belt is entwined. Both the drive drum and the driven drum reciprocate or oscillate as they rotate with respect to the worktable, carrying the belt with them, such that an oscillating or reciprocating belt sanding action is achieved.

SUMMARY OF THE INVENTION

The present invention relates to a further advancement over the invention of the '822 application and '507 patent. In particular, the present invention relates to a sander which, like the sanders disclosed in the '822 application and '507 patent, is convertible between a belt sander and a spindle sander. In addition, however, a sander in accordance with the present invention is further convertible to operate as an edge sander, advantageously facilitating the sanding of angled or beveled surfaces of a workpiece.

In one embodiment, the worktable is hinged or otherwise articulated such that it can be adjusted into a desired angular alignment with a substantially planar sanding surface.

BRIEF DESCRIPTION OF THE DRAWINGS

Various features and aspects of the present invention will perhaps be best appreciated with reference to detailed descriptions of specific embodiments of the invention, when read in conjunction with the accompanying drawings, wherein:

FIG. 18 is an exploded partial view of the belt/pulley system from FIG. 13;

DETAILED DESCRIPTION OF A SPECIFIC EMBODIMENT OF THE INVENTION

Figure 1:
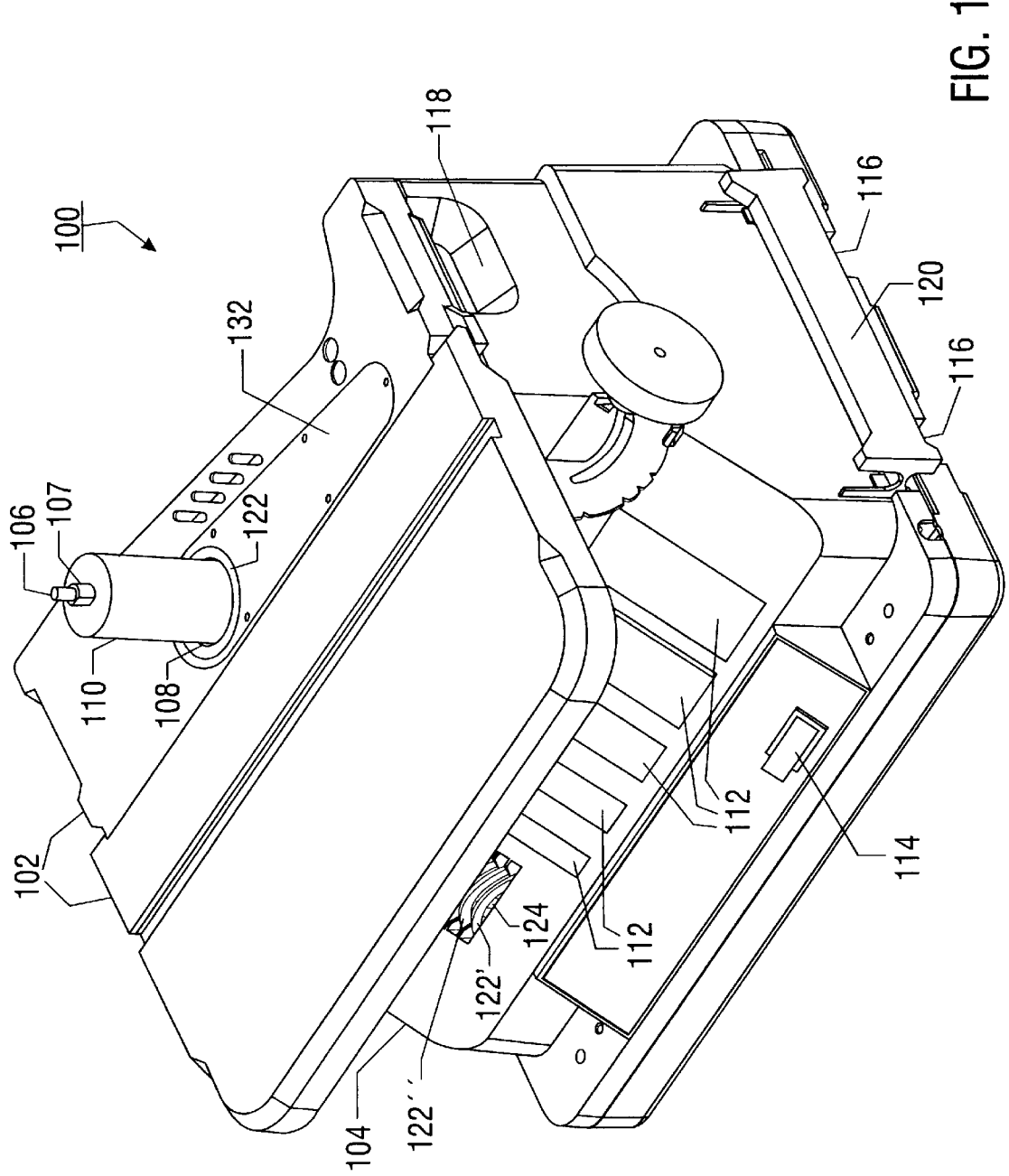
FIG. 1 is a frontal perspective view of an oscillating, interchangeable belt, spindle, and edge sander in accordance with one embodiment of the invention, configured in spindle sander mode.

Referring to FIG. 1, there is shown a frontal perspective view of an oscillating, interchangeable belt, spindle and edge sander 100 in accordance with one embodiment of the invention. Sander 100 comprises a worktable 102 supported by a main chassis 104. An output end of a motor shaft 106 extends upwardly through an aperture 108 in worktable 102.

A combination motor and mechanical drive system, not shown in FIG. 1, is housed within chassis 104, and operates to impart rotational and reciprocating or oscillatory motion to output motor drive shaft 106 associated therewith. As disclosed in detail in the above-referenced '507 patent and '822 application, the motor and mechanical drive system functions to impart both rotational and reciprocating or oscillatory motion to output shaft 106. Thus, when either a sanding spindle assembly or a belt sanding assembly is coupled to drive shaft 106, the sanding spindle or sanding belt is caused to rotate and oscillate/reciprocate with respect to worktable 102.

The details of the design and operation of one motor and mechanical drive system suitable for the purposes of practicing the present invention are disclosed and described in considerable detail in the above-referenced '507 patent and '822 application, and hence will not be repeated herein. Additionally, it is contemplated that other motor and mechanical drive systems for imparting rotational and oscillatory/reciprocating motion to a motor drive shaft, either now know or hereinafter developed, may be advantageously employed in the practice of the present invention. For example, it is believed that those of ordinary skill in the art having the benefit of the present disclosure could incorporate the teachings of U.S. Pat. No. 5,476,409 to Wada et al, entitled "Grinding Machine" into a sanding system in accordance with the present invention.

Figure 2:
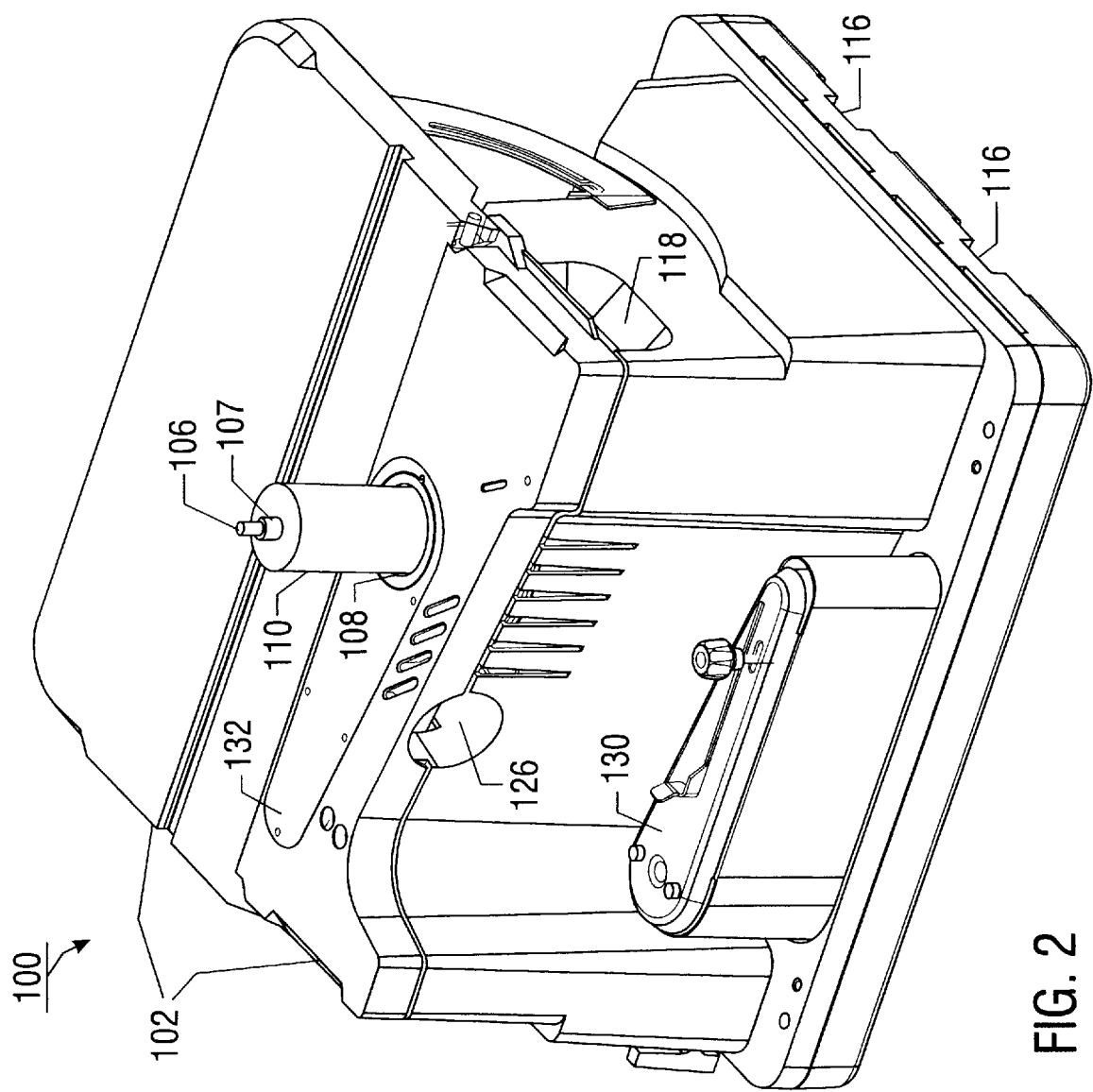
FIG. 2 is a rear perspective view of the sander from FIG. 1, configured in spindle sander mode.
Figure 3:
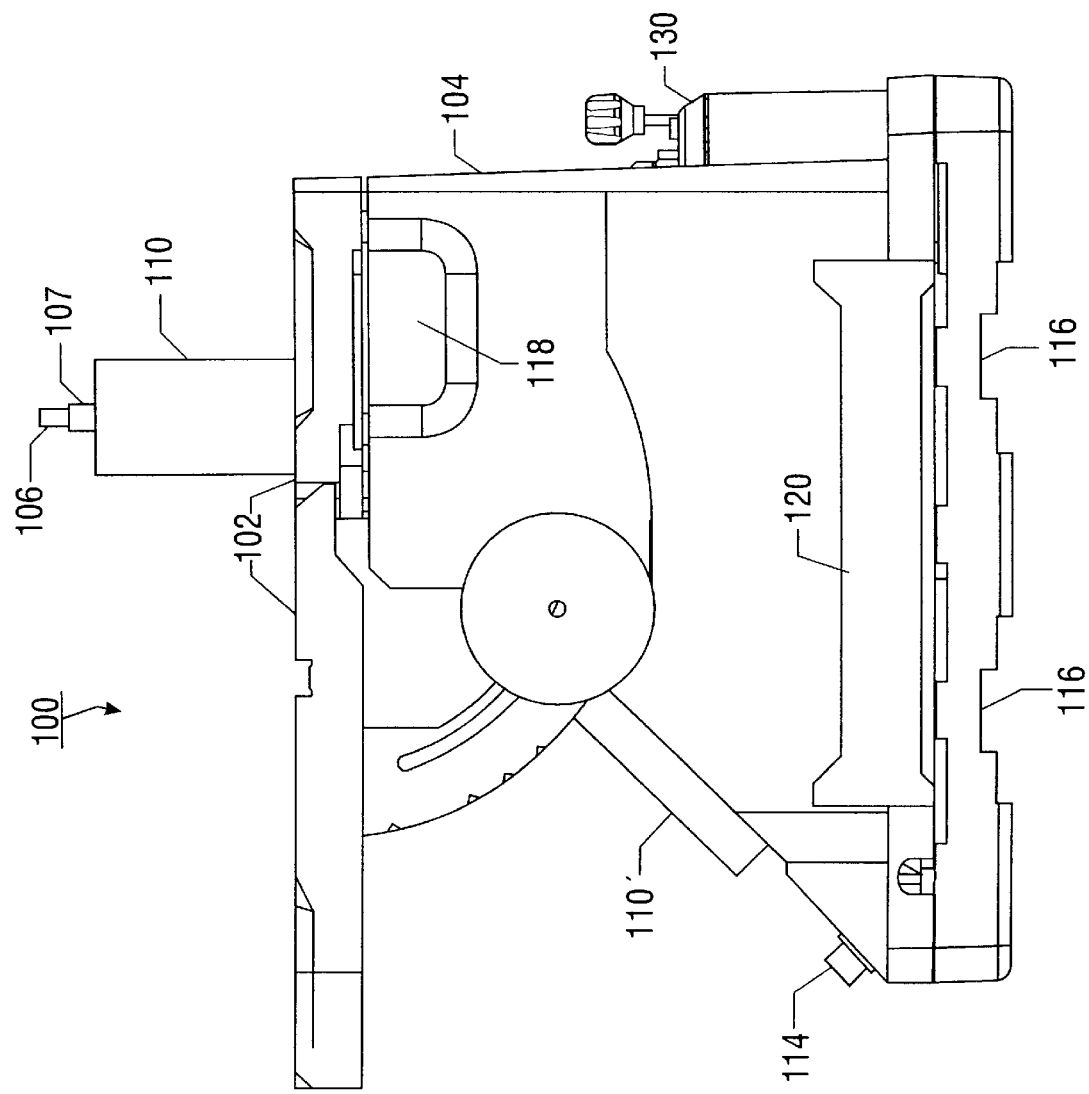
FIG. 3 is a side view of the sander from FIG. 1, configured in spindle sander mode.
Figure 4:
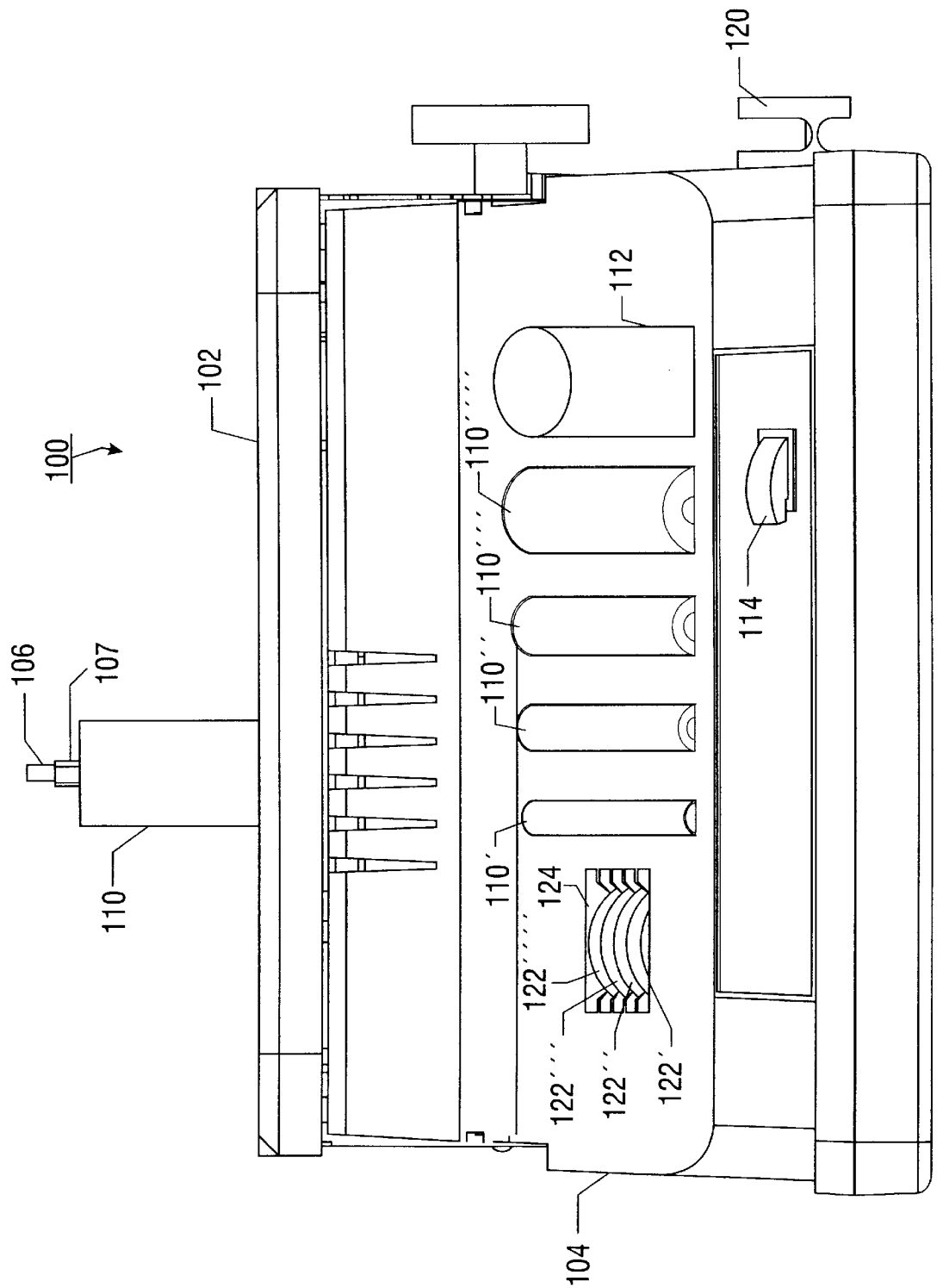
FIG. 4 is a front view of the sander from FIG. 1, configured in spindle sander mode.
Figure 5:
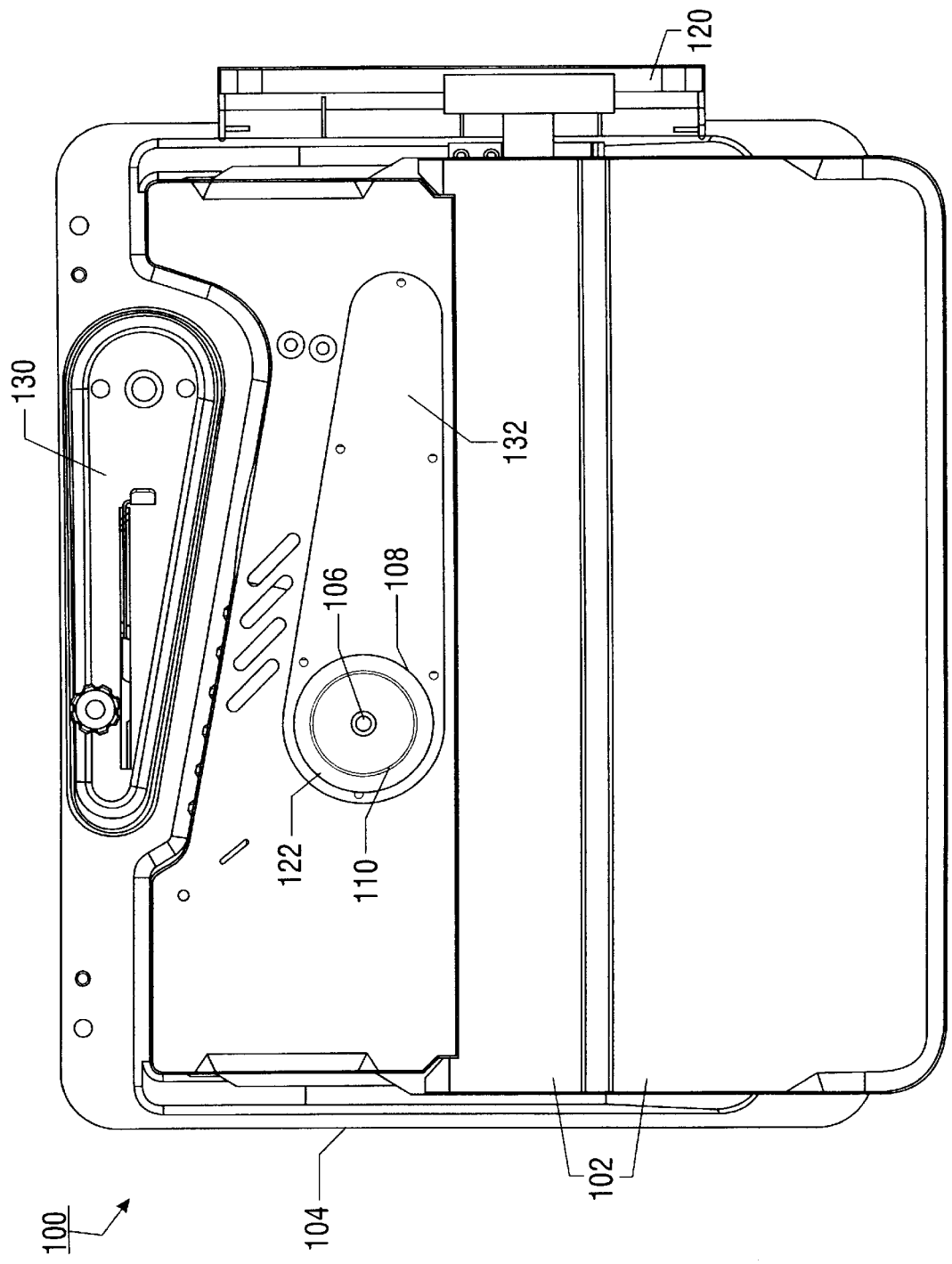
FIG. 5 is a top view of the sander from FIG. 1, configured in spindle sander mode.
Figure 6:
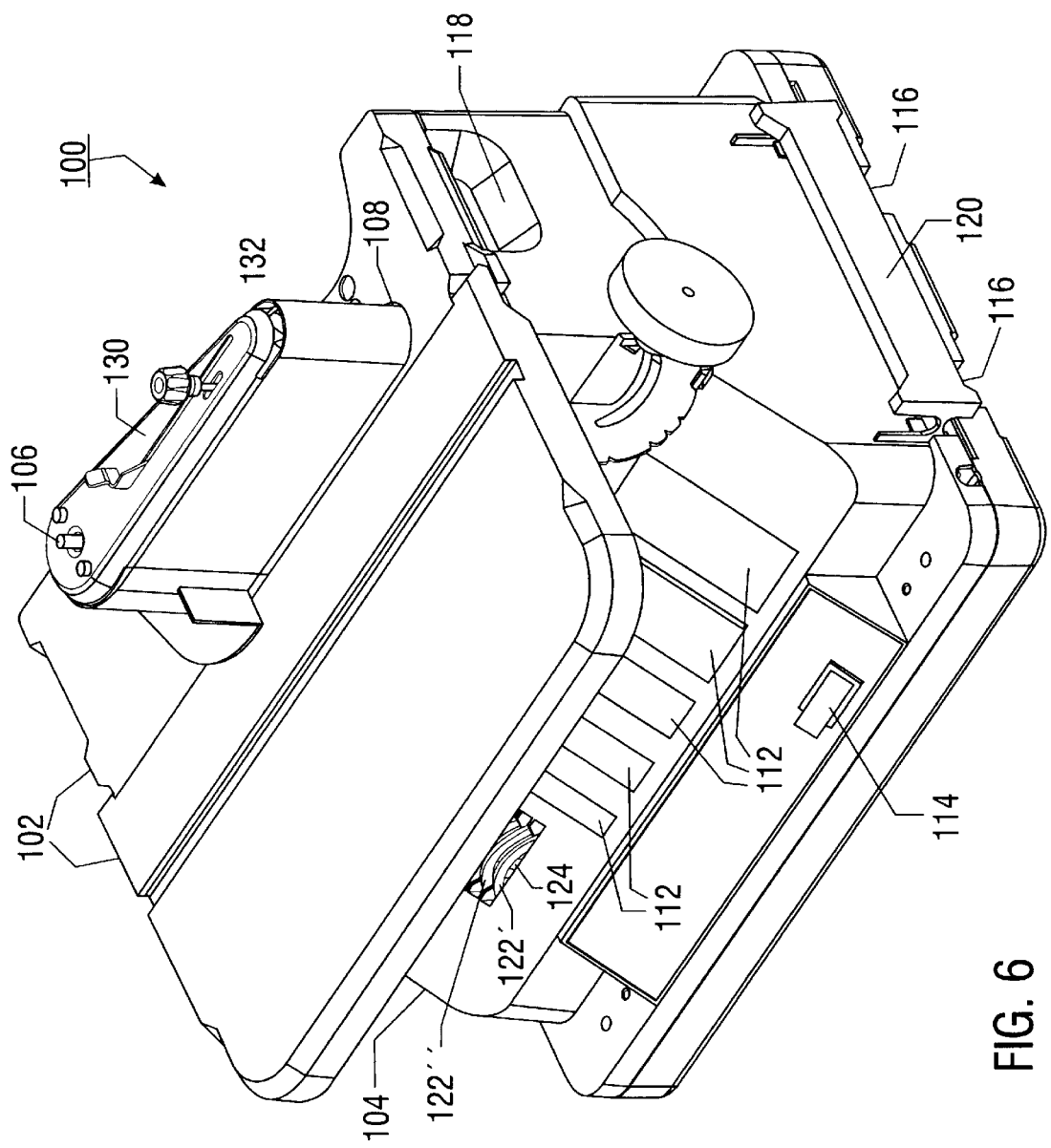
FIG. 6 is a frontal perspective view of the sander from FIG. 1, configured in belt sander mode.

FIG. 2 is a rear perspective view of sander 100. FIG. 3 is a side view of sander 100, FIG. 4 is a front view of sander 100, and FIG. 5 is a top view of sander 100. In all of FIGS. 1–5, sander 100 is configured in spindle sander mode, wherein a sanding spindle assembly comprising a shaft or spindle 109 and a sanding spindle sleeve 110 has been mounted upon output motor shaft 106. (It is to be understood that elements of sander 100 which are depicted in multiple Figures will retain the same reference numerals throughout the Figures and the present description.) A plurality of sanding spindle sleeves 110, 110', 110", etc . . . of varying sizes are preferably provided, each adapted to be interchangeably installed over spindle 109 in a customary manner.

Again, the operation and use of sander 100 in spindle sander mode is described in detail in the above-referenced '507 patent and '822 application, and will thus not be described again herein in detail.

There are a number of advantageous features of sander 100 as thus far depicted FIGS. 1–5. As shown in FIGS. 1, 3, and 4, a plurality of recesses or compartments 112 are provided in a front-facing portion of chassis 104, these compartments 112 being sized so as to provide convenient storage sanding spindle sleeves 110", 110Δ, 110''' and so on of various sizes when those sleeves are not being used. On/Off switch 114 is similarly disposed generally on the front of chassis 104, for convenient access.

While chassis 104 could be made of metal (which has the advantage of being very strong), chassis 104 in the presently disclosed embodiment is preferably made of a high-impact plastic material, so as to render sander 100 reasonably durable yet lightweight. While plastic-chassis bench tools such as sander 100 typically are open on their undersides, this can present a problem. The main power wiring (from the power cord (not shown) to switch 114 and to the motor (not shown)) must be protected. Those of ordinary skill in the art will appreciate that this is typically done with jacketed power cords. With grounded tools, the power ground lead must terminate where it can ground the motor. With metal-chassis tools, this is very simply accomplished, with the chassis itself providing the electrical connection between the incoming ground lead an the motor. With plastic-chassis tools, the ground lead must extend all the way to the motor and hence must be protected.

Accordingly, chassis 104 in one embodiment preferably has a bottom, made, for example, of impact-resistant molded plastic, propylene or the like (whereas chassis 104 itself may preferably be made of less expensive and lighter styrene or the like). This provides robust protection against rough handling and use of sander 100, and advantageously protects internal wiring and other components, such as the motor drive, from damage.

The aforementioned bottom of chassis 104 is preferably provided with notches 116 on the bottom thereof, to facilitate the mounting of sander 100 on a sawhorse made, for example, from common two-by-four lumber.

Hand-hold recesses 118 also are preferably formed in chassis 104, for ease of carrying sander 100. A rack 120 may be provided on chassis 104 for storage of a wrench or the like (not shown) which may be needed for the process of converting sander 100 between its various modes of operation, as will be hereinafter described.

As noted above, sander 100 is provided with a plurality of sanding spindles 110, 110', 110", etc . . . of varying sizes, so that sanding jobs that require different size spindles can be accommodated. When spindles of different sizes (diameters) are used, the diameter of aperture 108 is also preferably changed accordingly, so as to avoid an undesirably large gap between worktable 102 and spindle 106. To this end, the diameter of aperture 108 is determined by a removable, washer-like throat plate 122, and multiple throat plates 122', 122", 122''', etc . . . of varying sizes corresponding to the varying sizes of spindles 110, are provided. A compartment 124 may be provided in chassis 104 for storage of unused throat plates 122', 122", etc . . . .

As shown in FIG. 2, a sawdust output port 126 may be provided in chassis 104 adapted to receive the nozzle or hose from a vacuum, thereby establishing a dust collection system which minimizes the accumulation of sawdust on the floor or in the air during use of sander 100.

As noted above, in FIGS. 1–5, sander 100 is depicted in spindle sanding mode. Turning now to FIGS. 6–9, sander 100 is depicted therein having been converted to belt sanding mode. Conversion between spindle sanding mode and belt sanding mode involves removal of sanding spindle 110 from output motor shaft end 106, and installation of a belt sanding belt/pulley system 130. In one embodiment, spindle 110 is secured to motor shaft end 106 by means of a nut 107 adapted to be threaded onto the end of shaft 106 (see FIGS. 1–5), such that removal of spindle 110 involves simply unthreading nut 107.

To facilitate installation of belt/pulley system 130, worktable 102 is provided with a removable adapter 132. Referring to FIGS. 1–5, when sander 100 is operated in spindle sanding mode, adapter 132 is disposed in worktable 102 so as to define aperture 108 into which one of the several throat plates 122, 122', etc . . . are placed, a particular throat plate 122 being selected according to which size spindle 110 is being used.

Figure 7:
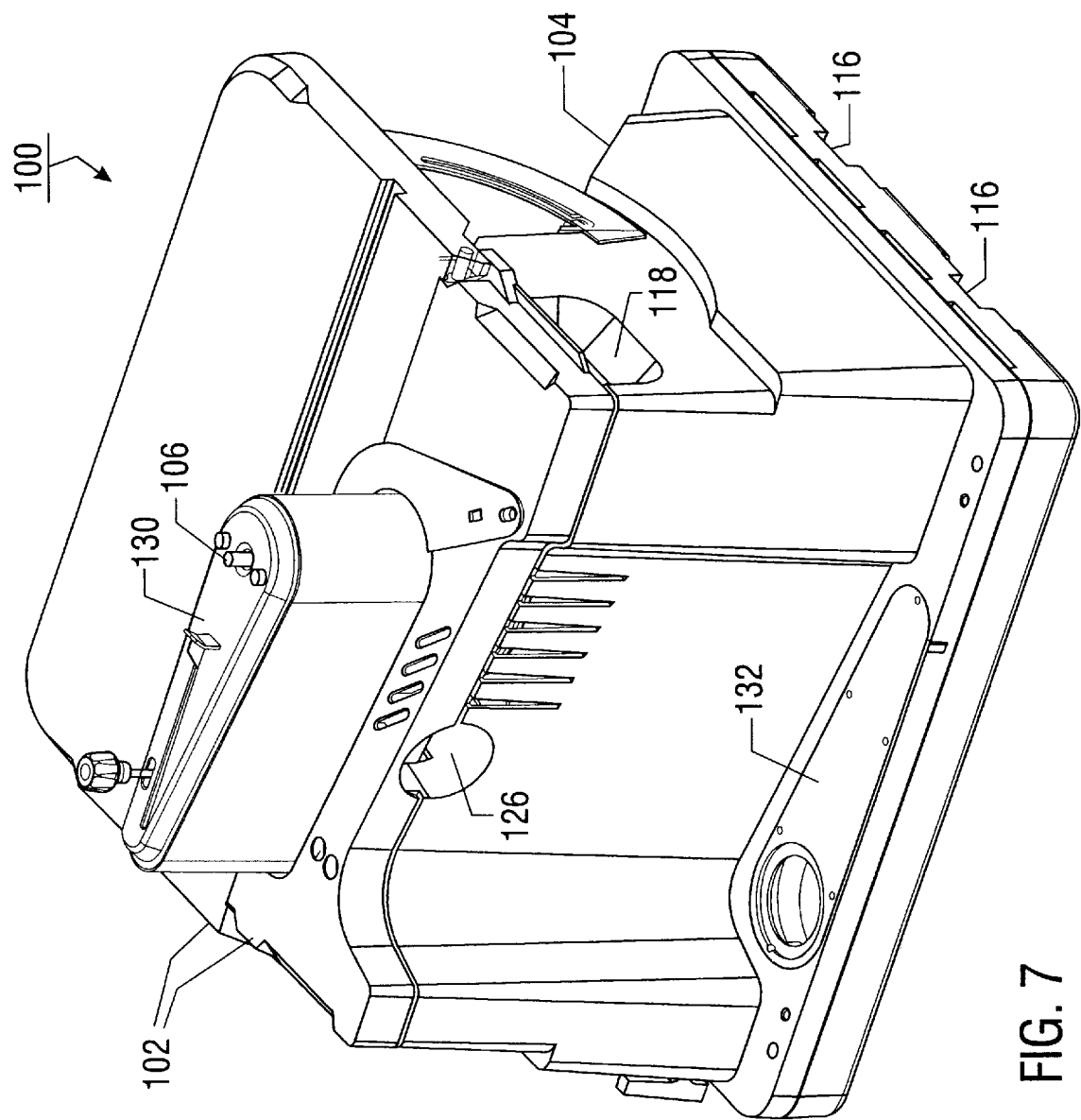
FIG. 7 is a rear perspective view of the sander from FIG. 1, configured in belt sander mode.
Figure 9:
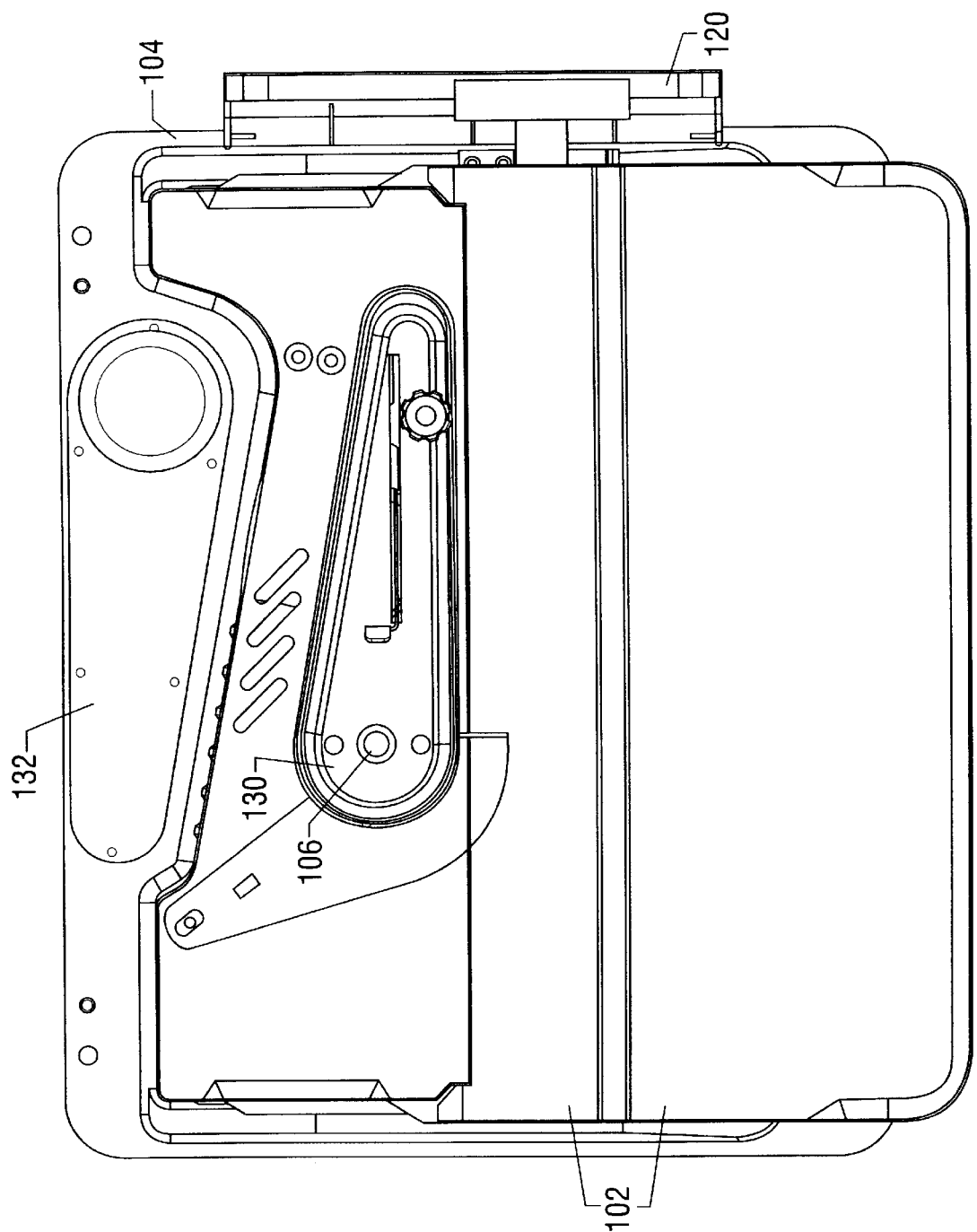
FIG. 9 is a top view of the sander from FIG. 1, configured in belt sander mode.

When converted to belt sanding mode, however, adapter 132 is removed from worktable 102, thereby rendering aperture 108 suitable for receiving belt/pulley system 130. FIGS. 2, 3, and 5 shows how belt/pulley system 130 is preferably stowed within a correspondingly shaped recess 134 in chassis 104 when sander 100 is being operated in spindle sanding mode. On the other hand, when sander 100 is operated in belt sanding mode (or in edge sanding mode, as will be hereinafter described in further detail), recess 134 provides a convenient place for storage of adapter 132, as shown in FIGS. 7 and 9.

Figure 13:
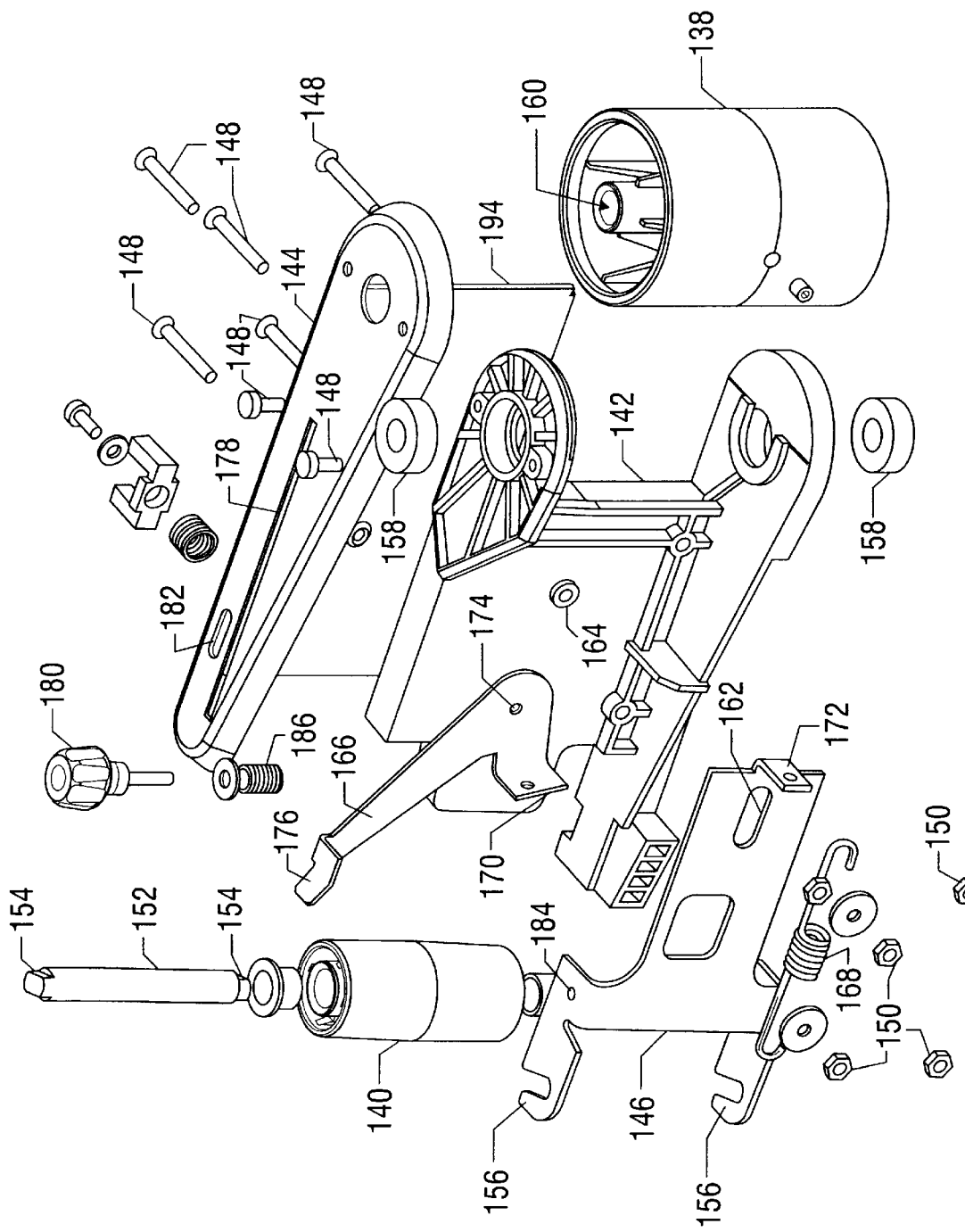
FIG. 13 is an exploded view of a belt/pulley assembly in the sander of FIG. 1.

The design and configuration of belt/pulley system 130 will be best understood with reference to FIGS. 13–17. FIG. 13 is an exploded view of belt/pulley system 130 in accordance with the presently disclosed embodiment of the invention. Belt/pulley system 130 essentially comprises a chassis adapted to support a drive drum 138 and a driven drum 140. In the presently disclosed embodiment, the chassis of belt/pulley system comprises three chassis members 142, 144, and 146 affixed together with a plurality of bolts 148 and nuts 150.

Driven drum 140 is supported by and rotates about a driven drum shaft 152, which in turn is supported by third chassis member 146. As shown in FIG. 13, shaft 152 in the presently disclosed embodiment of the invention has flattened or keyed ends 154 adapted to be received within correspondingly configured slots 156 in third chassis member 146 (as is especially apparent in FIG. 13).

Drive drum 138 is supported by means of two bearings 158 (see FIGS. 13 and 15), which in turn are supported by first chassis member 142. Drive drum 138 has a central lumen 160 defined therein (see FIGS. 13 and 17) for enabling belt/pulley system to be installed onto output motor drive shaft end 106, previously described with reference to FIGS. 1–12.

Figure 15:
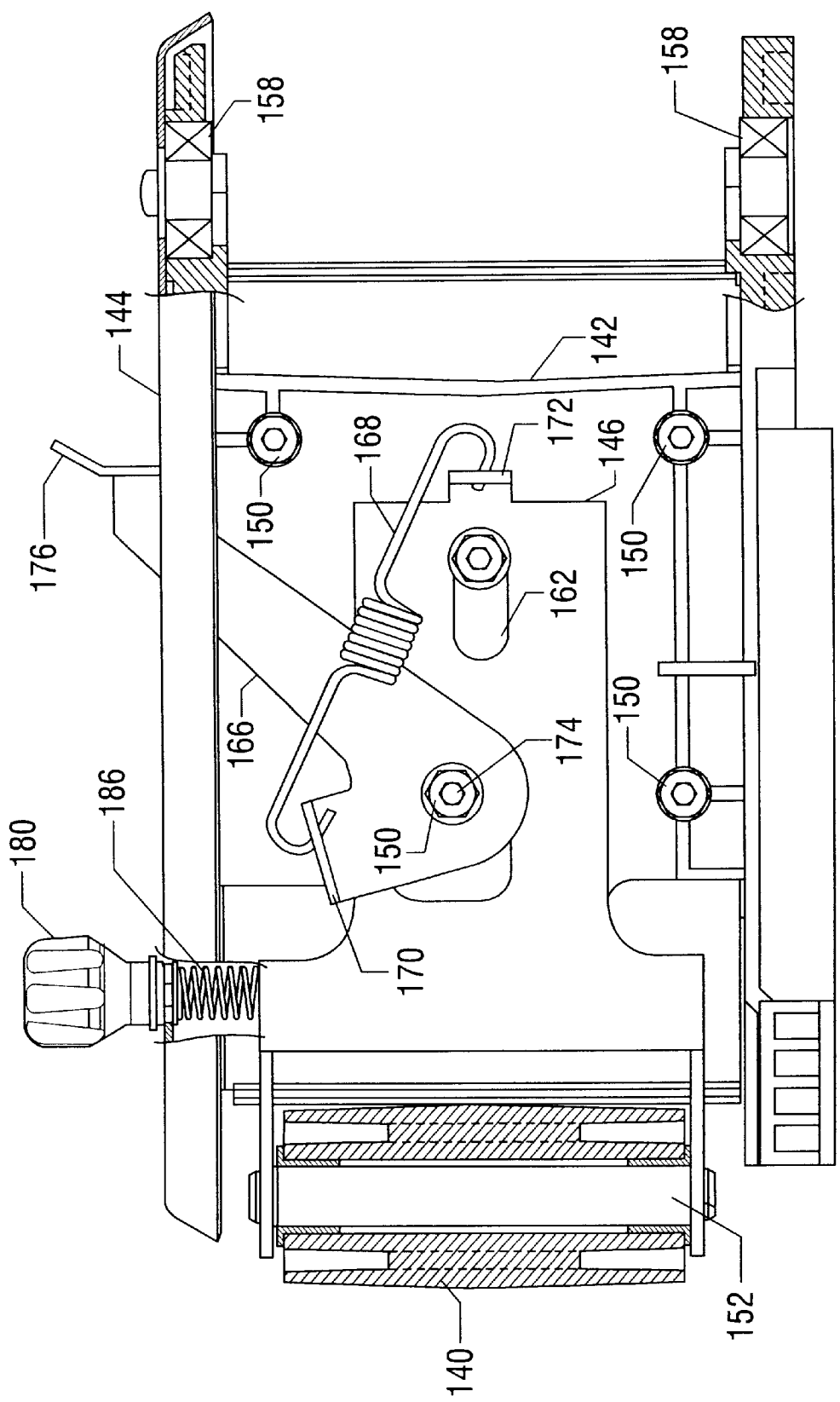
FIG. 15 is a back view of the belt/pulley assembly from FIG. 13.
Figure 16:
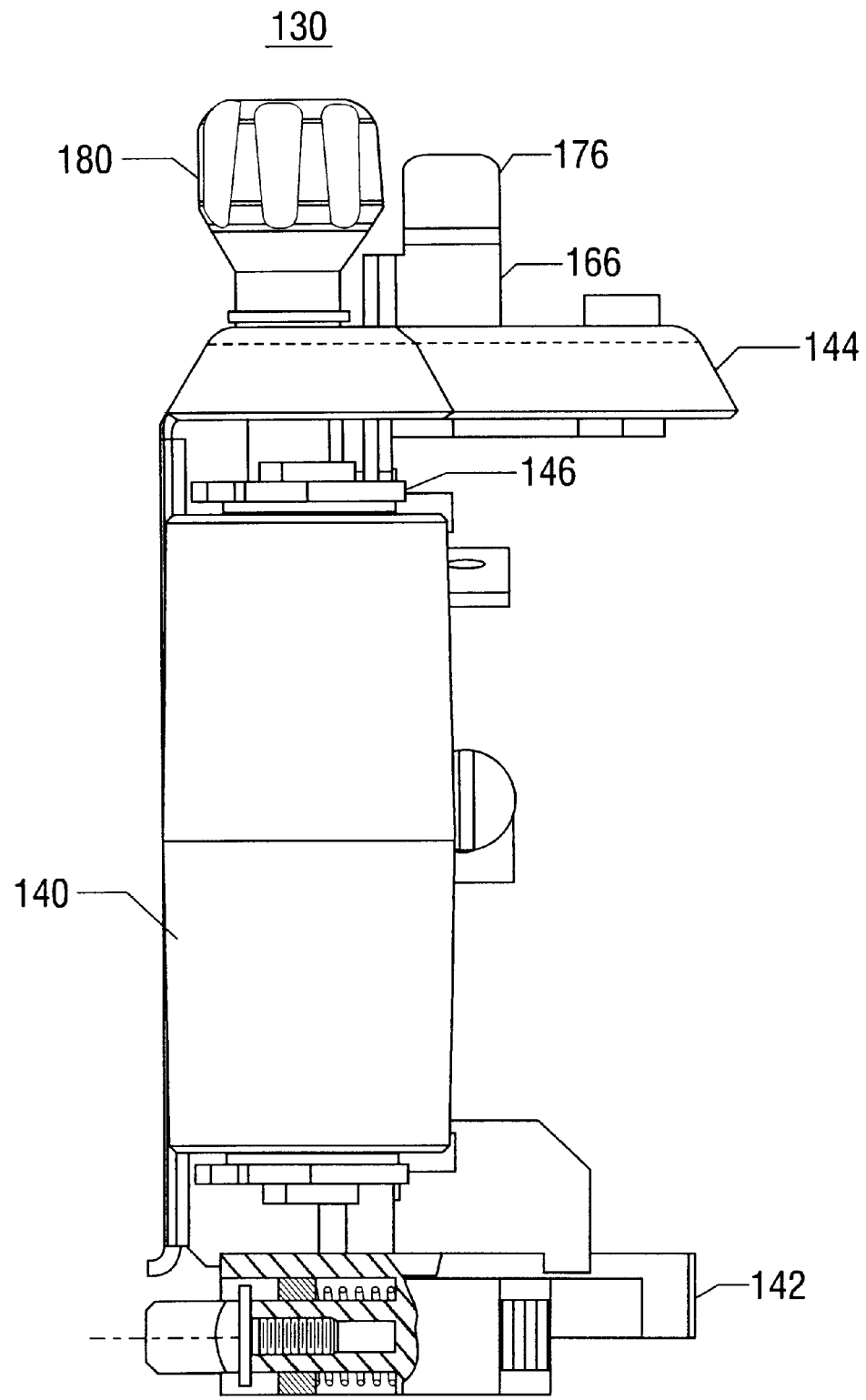
FIG. 16 is a side view of the belt/pulley assembly from FIG. 13.
Figure 17:
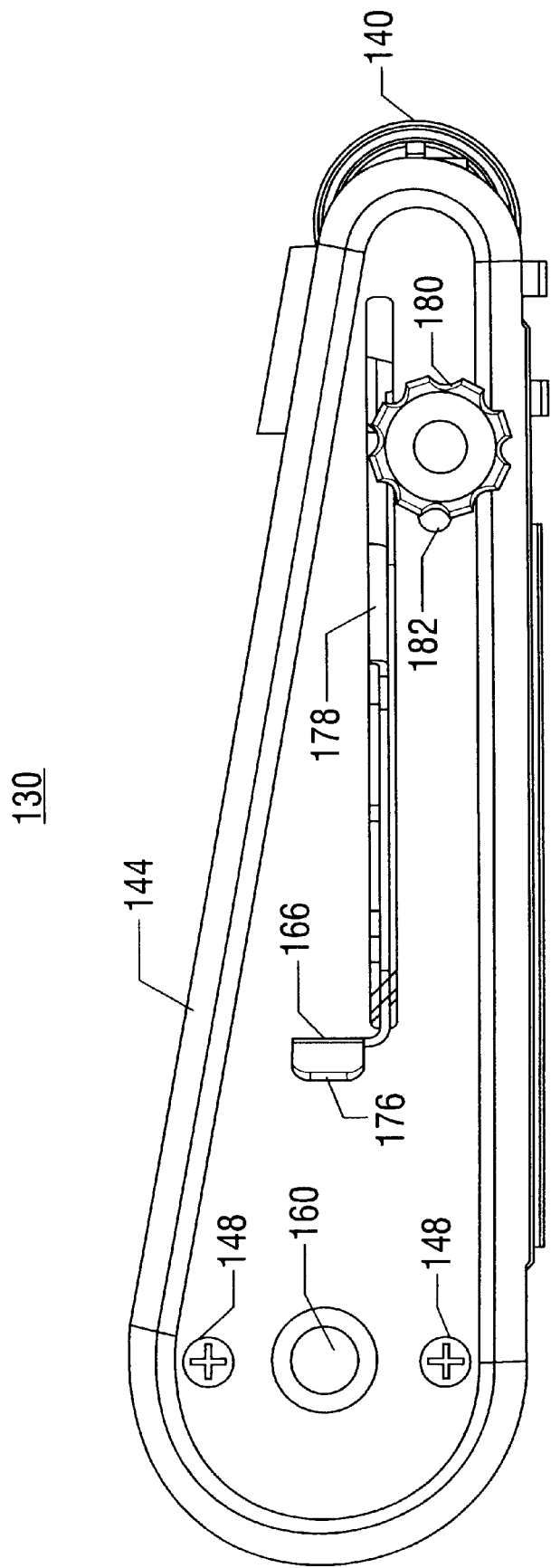
FIG. 17 is a top view of the belt/pulley assembly from FIG. 13.

When belt/pulley assembly 130 is assembled, chassis members 142 and 146 are slidable with respect to one another, by virtue of a slot 162 in member 146 (see FIGS. 13 and 15) which engages a washer-like projection 164 formed on chassis member 142, a bolt and nut 148 and 150 extending through slot 162 and chassis member 145 to slidably secure chassis members 142 and 146 as shown in FIG. 15.

Since chassis member 142 carries drive drum 138 and chassis member 146 carries driven drum 140, the sliding relationship of chassis members 142 and 146 facilitates the tensioning of a belt (not shown) entwined around drums 138 and 140. To maintain such tension on the belt, a lever and spring tensioning system is provided, consisting of a lever 166 and a spring 168 which extends between a tab 170 defined by lever 166 and a tab 172 defined by chassis member 146. Lever 166 rotates about a pivot 174 with a handle portion of lever 166 extending through a slot 176 in chassis member 144.

As can be observed from FIG. 15, for example, when handle 176 of lever 166 is brought into a release position (such as it is in FIG. 15), spring 168 tends to exert force on chassis member 146, such that chassis member 146, and hence driven drum 140, are pulled away from drive drum 138. On the other hand, when handle 176 of lever 166 is moved along slot 178 to the opposite or release position, the spring force on chassis member 146 and driven drum 140 is relieved. This releases pressure on the belt, for example, when the belt is removed for replacement.

A spring-biases alignment knob 180 extends through a slot 182 in chassis member 144 and is threadably received within a hole 184 in chassis member 142, securing a spring 186 between chassis members 144 and 146. As would be appreciated by those of ordinary skill in the art, rotational adjustment of knob 180 thus facilitates adjustment of the mutual vertical alignment of drive drum 138 and driven drum 140. This is important to prevent belt slippage during operation of sander 100, which can occur if drive drum 138 and driven drum 140 are not vertically aligned with one another.

Figure 14:
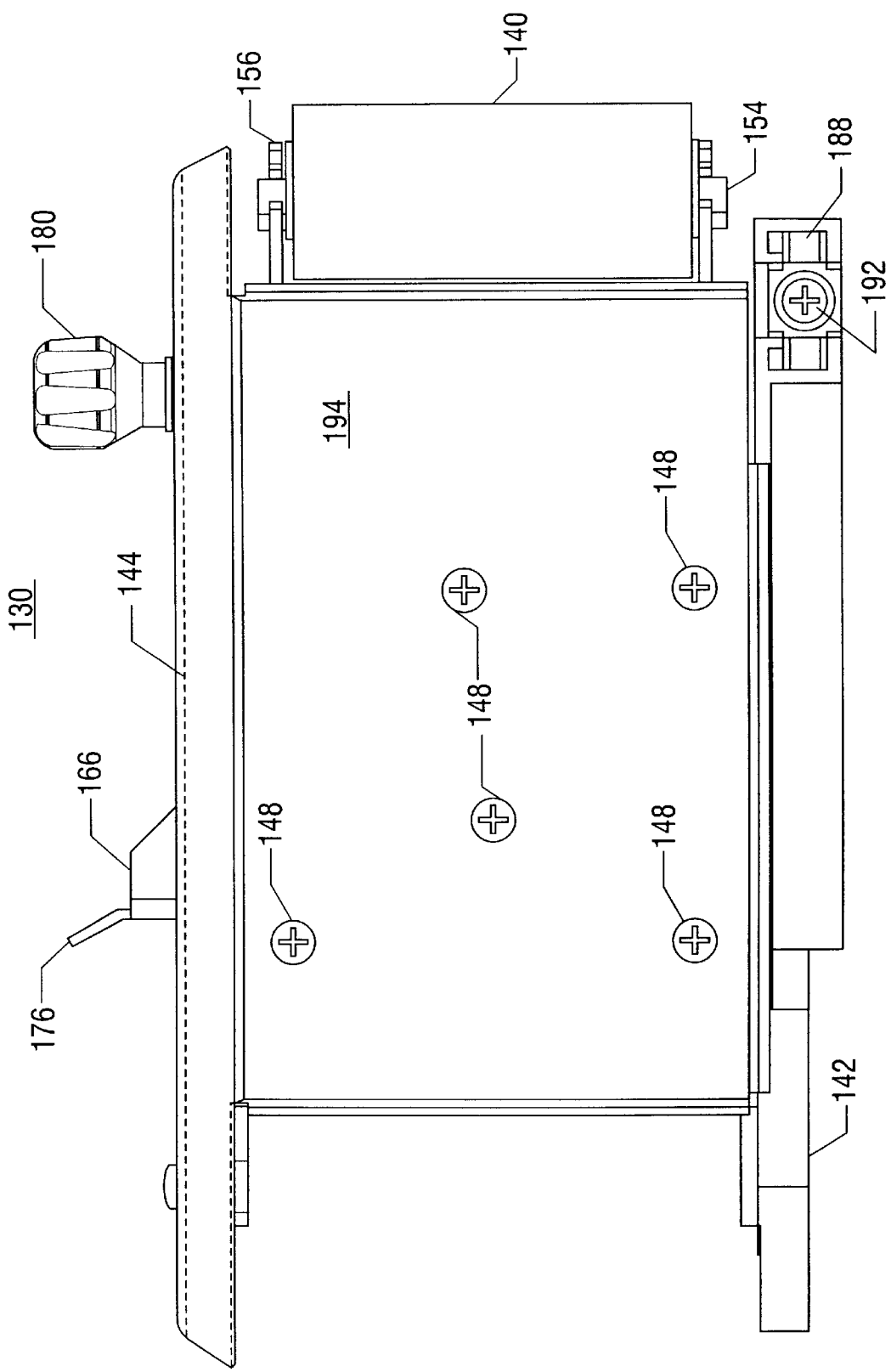
FIG. 14 is a front view of the belt/pulley assembly from FIG. 13.

As can be seen in FIG. 14, a front portion 194 of chassis member 144 defines a substantially planar face of belt/pulley assembly 130, against which the sanding belt rides during operation of sander 100. Face 194 supports the sanding belt when a workpiece is pressed against belt/pulley assembly 130 to accomplish a sanding operation.

FIG. 18 is an exploded partial view of belt/pulley assembly 130 which illustrates the manner in which drive drum 138 is removably coupled to chassis member 142 in accordance with one embodiment of the invention. As previously noted, drive drum 138 is installed such that motor drive shaft end 106 extends into its central lumen 160. A coupling 204 is provided to prevent drive drum 138 from rotating with respect to drive shaft end 106 as follows: Coupling 204 is provided with three flats 206 on its outer surface which are adapted to engage corresponding flats 208 on the internal diameter of lumen 106. Similarly, the inner lumen 210 of coupling 204 is D-shaped, so as to engage the D-shaped outer diameter of drive shaft end 206. Finally, a nut 212 is provided to secure coupling 204 to drive shaft end 206. The result is that torque and rotation are transmitted from the motor shaft 206 to coupling 204, and from coupling 204 to drive drum 138. Since the anti-rotation features of coupling 204 as just described are slidably connected, drive drum 138 can be easily secured and removed from shaft 106.

Figure 8:
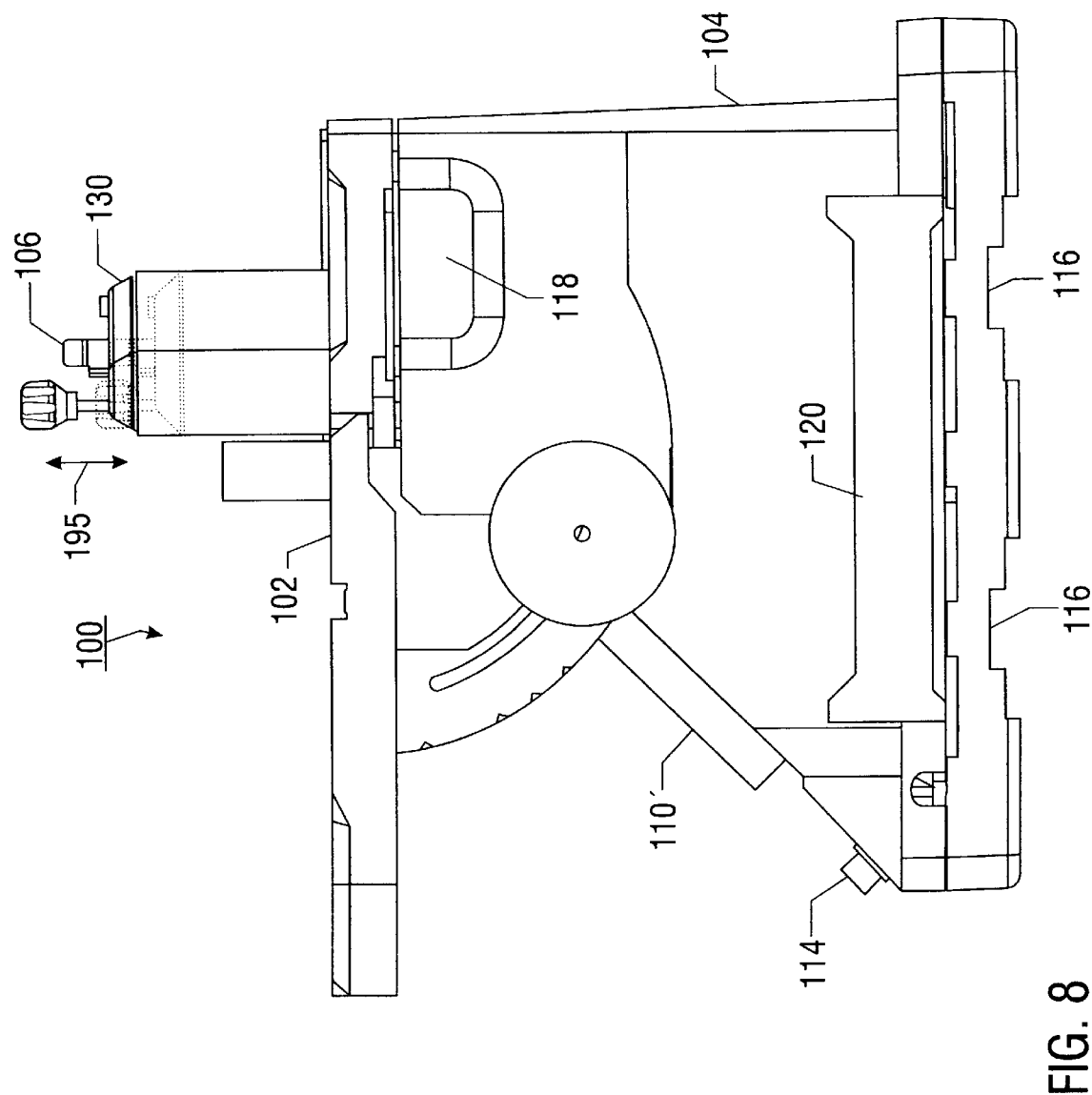
FIG. 8 is a side view of the sander from FIG. 1, configured in belt sander mode.

When operated in belt sanding mode, because belt/pulley assembly 130 is coupled to output motor shaft end 106, the entire assembly 130, including both drive drum 138 and driven drum 140, reciprocate or oscillate up and down, as represented by arrow 195 in FIG. 8. As belt/pulley assembly 130 reciprocates up and down, a bottom portion thereof is periodically drawn into aperture 108 and into chassis 104. Belt/pulley assembly 130 is shown in this position in phantom in FIG. 8.

As noted above, in accordance with one aspect of the invention, sander 100 is, in addition to being operable in a spindle sanding mode and a belt sanding mode, is further operable in an edge sanding mode, in which a front portion of worktable 102 is angularly adjusted with respect to belt/pulley system 130 (and the face 194 thereof, in particular). This advantageously facilitates the sanding of beveled or angled edges of a workpiece.

Figure 10:
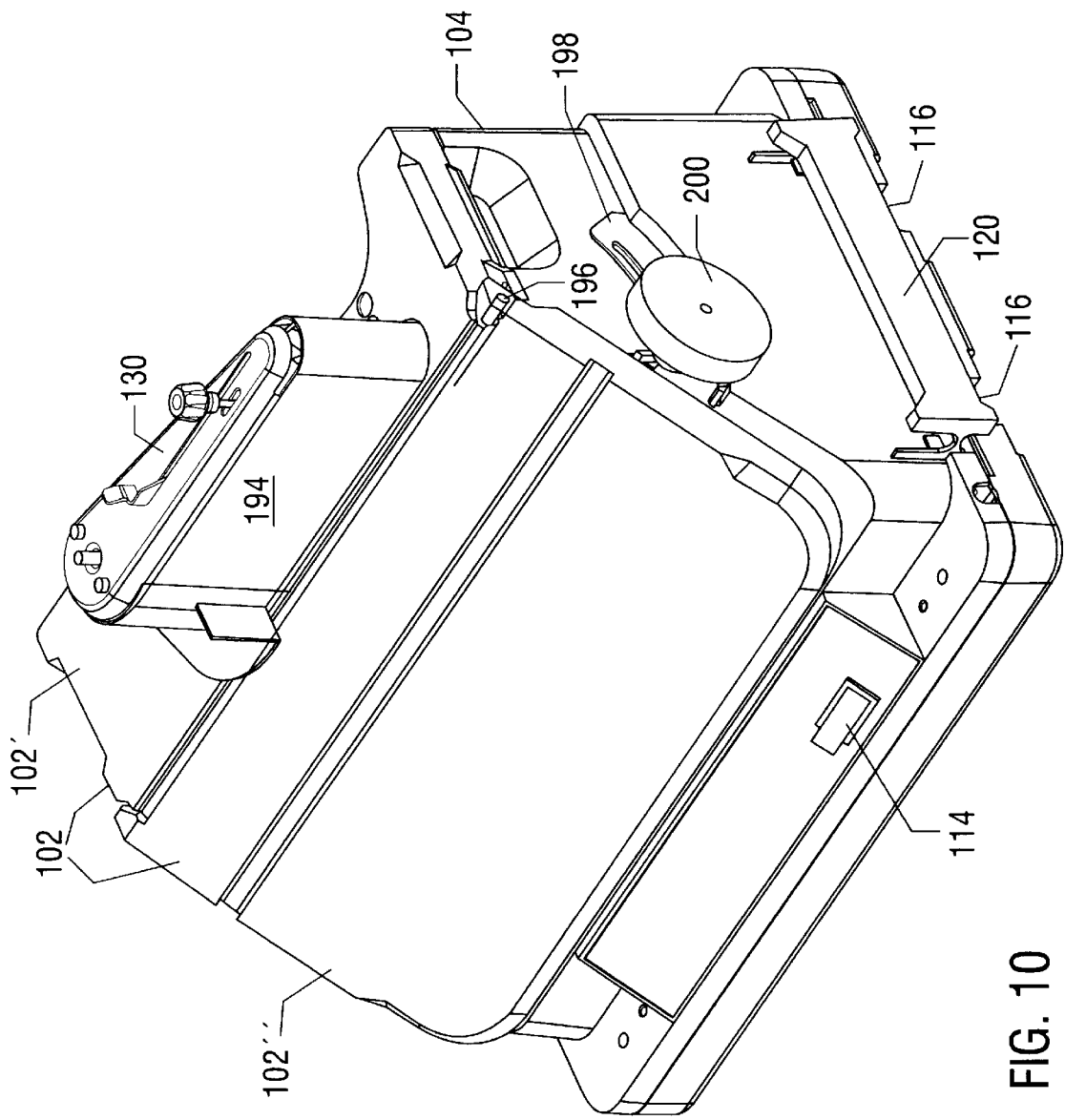
FIG. 10 is a frontal perspective view of the sander from FIG. 1, configured in edge sander mode.
Figure 11:
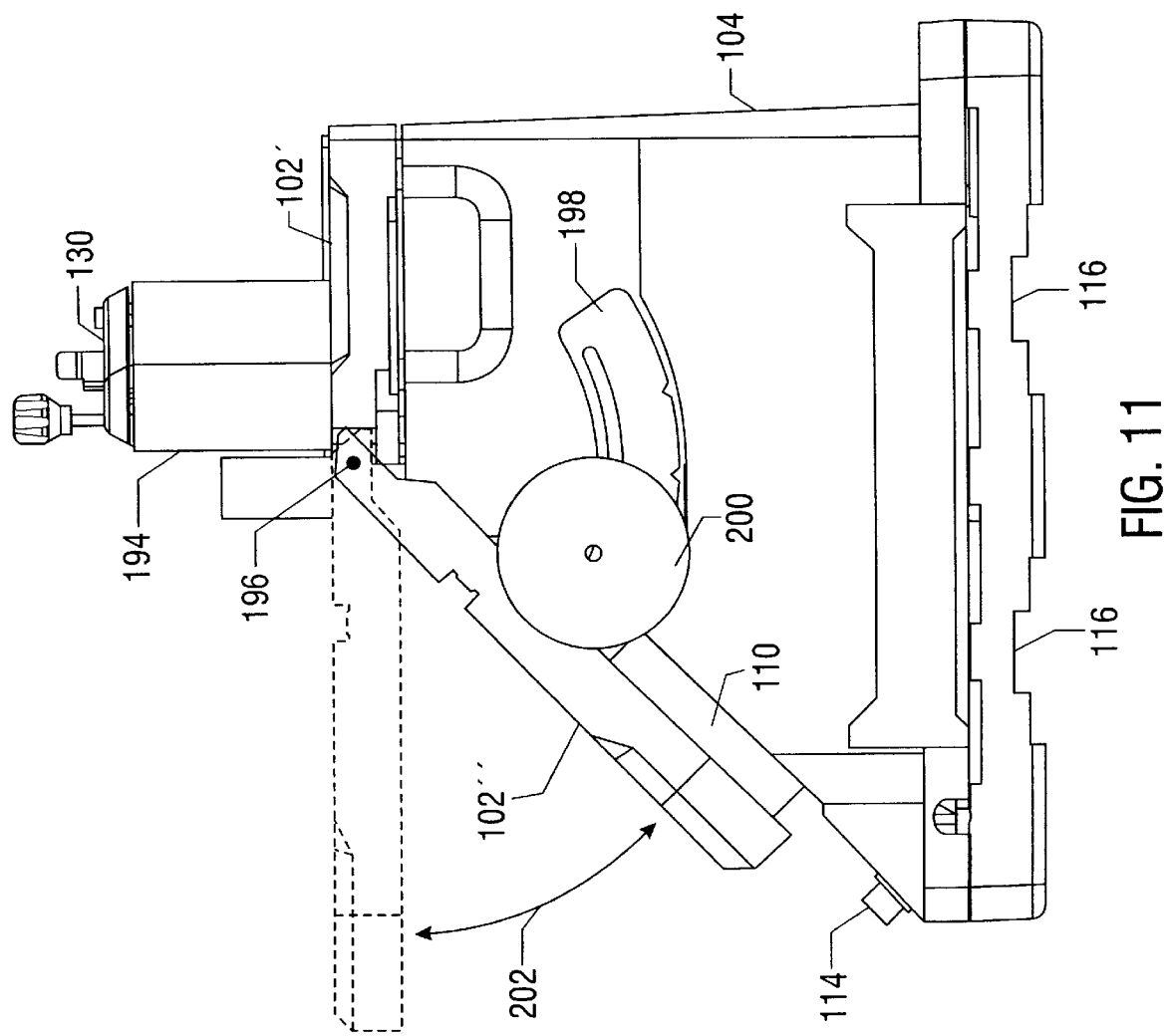
FIG. 11 is a side view of the sander from FIG. 1, configured in edge sander mode.
Figure 12:
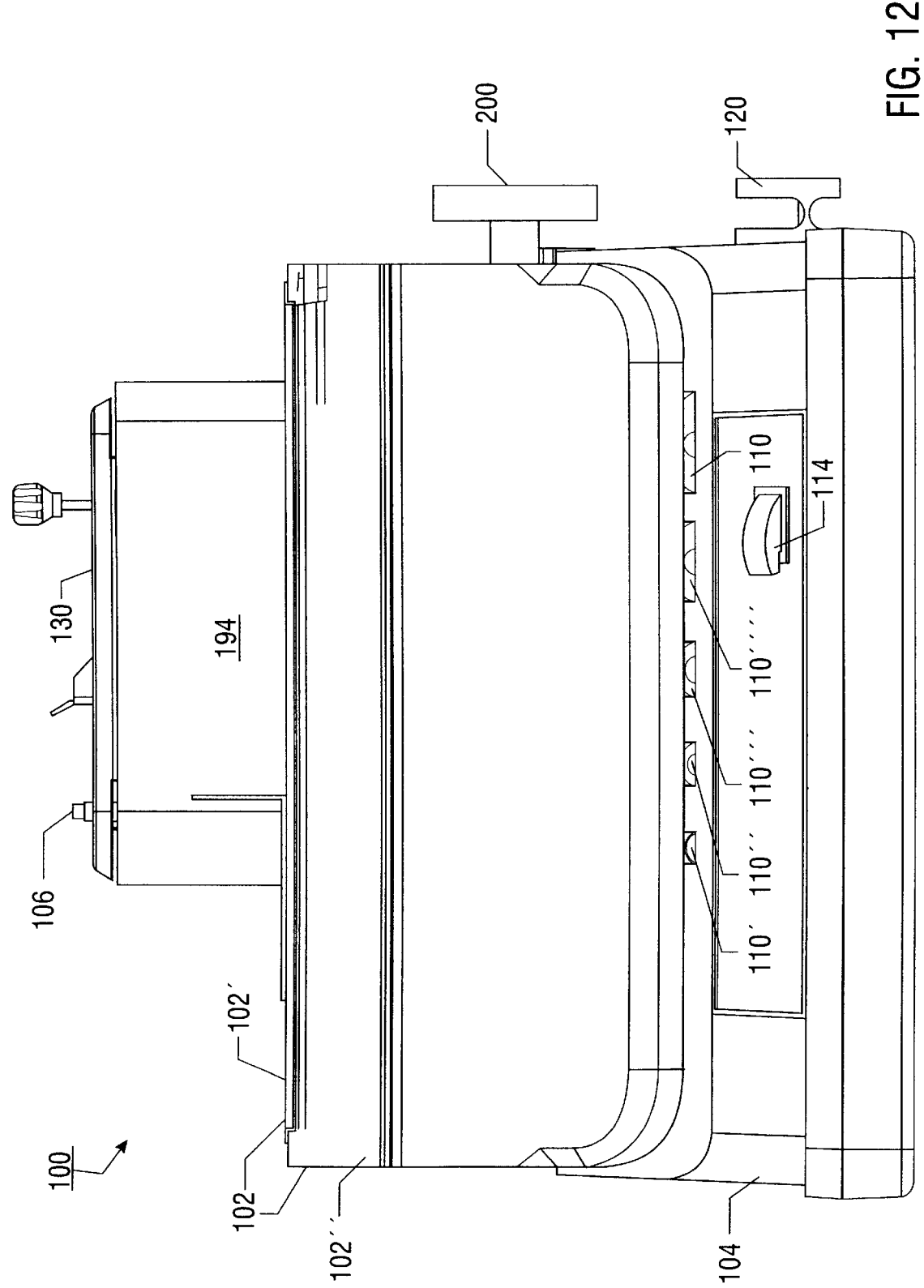
FIG. 12 is a front view of the sander from FIG. 1, configured in edge sander mode.

FIGS. 10 through 12 depict sander 100 configured in edge sanding mode. In accordance with one aspect of the invention, worktable 102 is preferably hinged or articulated at a pivot point designated with reference numeral 196. (In FIGS. 10–12, the belt/pulley assembly is identified with reference numeral 130, while the reference numerals for the numerous individual components of belt/pulley system 130 discussed above are omitted for the sake of clarity.)

As shown in the side view of FIG. 11, with the provision of hinge or pivot 196, worktable 102 effectively comprises a stationary portion 102' and an articulating or adjustable portion 102". Adjustable portion 102" of worktable 102 has an arcurate, slotted bracket 198 disposed on an underside thereof, for facilitating securing adjustable worktable portion 102" at a desired angular position with respect to the stationary portion 102' and with respect to belt/pulley system 130. (In one embodiment, two arcurate, slotted brackets 198 are provided, one on each side of adjustable worktable portion 102".) A clamping knob 200 extends through the slot in bracket 198 so that, when tightened, adjustable worktable portion 102" is secured in the desired angular position.

As indicated by arrow 202 in FIG. 11, adjustable worktable portion 102" is angularly adjustable from a fully articulated position in which the angle between its upper surface and face 194 of belt/pulley assembly 130 is substantially 135° (i.e., 45° below perpendicular), to the position, shown in phantom in FIG. 11, in which the angle between adjustable worktable portion 102" and face 194 of belt/pulley assembly 130 is 90° (i.e., perpendicular to face 194). The position shown in phantom in FIG. 11 is the position in which adjustable portion 102" is normally disposed in belt sanding and spindle sanding modes.

In accordance with one aspect of the invention, when adjustable worktable portion 102" is in the fully articulated position shown in FIGS. 10 and 12, for example, the underside of worktable portion 102" is disposed substantially directly above chassis 104. That is, when in the fully articulated position, adjustable worktable portion 102" effectively serves as a lid for securing the various sanding accessories, including spare spindles 110, 110', 110", etc . . . , spare throat plates 122,122', 122", etc . . . , and so on, in their respective compartments formed in chassis 104, as discussed above. (see, for example, FIG. 12). Securing the various sanding accessories in this way advantageously improves the portability of sander 100, as the accessories are less likely to be dropped, lost or left behind when sander 100 is moved.

In one embodiment of the invention, the two portions 102' and 102" of worktable 102 are articulated by means of a rod or pin extending between interlocking edges of the respective worktable portions in a hinge-pin type of arrangement. It is contemplated, however, that various other hinging or articulating configurations would be equally suitable for the purposes of practicing the present invention, and that selecting or designing a particular articulating configuration for worktable portions 102' and 102" would be a matter of routine engineering for persons of ordinary skill in the art.

From the foregoing detailed description of a specific embodiment of the invention, it should be apparent that a sanding apparatus has been disclosed which includes a motor and mechanical drive for imparting both rotational and oscillatory motion to a sanding devices secured thereto. In one embodiment, the sanding apparatus includes different interchangeable sanding surfaces, e.g., a spindle sanding drum and a belt sanding belt/pulley assembly, each of which being adapted to be coupled to the motor and mechanical drive.

Although a specific embodiment of the invention has been disclosed herein in some detail, it is to be understood that this has been done only for the purposes of illustrating various aspects and features of the invention, and is not intended to be limiting with respect to the scope of the invention. It is contemplated that various alterations, substitutions, and/or modifications, including but not limited to those design alternatives that may have been mentioned herein, may be made to the disclosed embodiment without departing from the spirit and scope of the invention, as defined in the appended claims.

While the present invention has been described in connection with a sanding apparatus which is convertible between multiple modes of operation (e.g., spindle sanding mode, belt sanding mode, and edge sanding mode), it is contemplated that the present invention may be advantageously practiced in connection with a sanding apparatus having fewer, or perhaps only a single, dedicated mode of operation. For example, the present invention may be practiced in connection with a dedicated belt sanding apparatus, in which case there may not be a need to make the belt/pulley assembly detachable from the motor and mechanical drive system as has been described herein. It is believed that those having the benefit of the foregoing disclosure would be readily capable of adapting the present invention to realized such alternative embodiments of the invention.

What is claimed is:

1. A sanding apparatus convertible at least between a spindle sanding mode of operation and a belt sanding mode of operation, comprising:

a chassis, supporting a worktable and housing a motor drive system for imparting rotational and oscillating motion to an output motor drive shaft associated with said motor drive assembly, said output motor drive shaft extending through an aperture in said worktable;

a sanding spindle assembly, adapted to be attached to said output motor drive shaft so as to oscillate up and down and to rotate and with respect to said worktable;

a belt sanding belt/pulley assembly comprising a drive drum and a driven drum, said belt/pulley assembly adapted to be attached to said output motor drive shaft such that said drive drum and said driven drum oscillate up and down and to rotate with respect to said worktable;

said sanding apparatus being operable in said spindle sanding mode when said sanding spindle is attached to said output motor drive shaft and being operable in said belt sanding mode when said belt/pulley assembly is attached to said output motor drive shaft.

2. A sanding apparatus, comprising:

a chassis, supporting a worktable and housing a motor drive system for imparting rotational and oscillating motion to an output motor drive shaft associated with said motor drive system, said output motor drive shaft extending through an aperture in said worktable;

a belt sanding belt/pulley assembly, comprising a drive drum and a driven drum said belt/pulley assembly adapted to be attached to said output motor drive shaft such that said drive drum and said driven drum oscillate up and down and to rotate with respect to said worktable;

wherein said worktable is articulated such that at least a portion of said worktable is angularly adjustable with respect to said belt/pulley assembly, such that said apparatus is convertible between a belt sanding mode of operation in which said adjustable portion of said worktable is substantially perpendicular to a front face of said belt/pulley assembly, and an edge sanding mode of operation in which said adjustable portion of said worktable is not substantially perpendicular to said front face;

and wherein said apparatus is further convertible between said belt sanding mode of operation and a spindle sanding mode of operation, said apparatus further comprising:

a sanding spindle assembly, adapted to be attached to said output motor drive shaft so as to oscillate up and down and to rotate and with respect to said worktable;

said sanding apparatus being operable in said spindle sanding mode when said sanding spindle is attached to said output motor drive shaft and being operable in said belt sanding mode when said belt/pulley assembly is attached to said output motor drive shaft.

3. A sanding apparatus in accordance with claim 1, wherein said sanding apparatus is further convertible between said belt sanding mode of operation and an edge sanding mode of operation, said worktable being articulated such that when said belt sanding belt/pulley assembly is attached to said output motor drive shaft, an adjustable portion of said worktable is angularly adjustable with respect to a stationary portion of said worktable.

4. A sanding apparatus in accordance with claim 3, wherein said chassis has at least one spindle storage compartment formed therein for receiving said sanding spindle therein.

5. A sanding apparatus in accordance with claim 4, wherein said adjustable portion of said worktable is adjustable to a position in which said adjustable portion covers said spindle storage compartment.

6. A sanding apparatus convertible at least between a spindle sanding mode of operation and a belt sanding mode of operation, comprising:

a chassis, supporting a worktable and housing motor drive means for imparting rotational and oscillating motion to an output motor drive shaft associated with said motor drive assembly, said output motor drive shaft extending through an aperture in said worktable;

sanding spindle means, adapted to be attached to said output motor drive shaft so as to oscillate up and down and to rotate and with respect to said worktable;

belt sanding means comprising a drive drum and a driven drum, said belt sanding means adapted to be attached to said output motor drive shaft such that said drive drum and said driven drum oscillate up and down and to rotate with respect to said worktable;

said sanding apparatus being operable in said spindle sanding mode when said spindle sanding means is attached to said output motor drive shaft and being operable in said belt sanding mode when said belt sanding means is attached to said output motor drive shaft.

7. A sanding apparatus in accordance with claim 6, wherein said sanding apparatus is further convertible between said belt sanding mode of operation and an edge sanding mode of operation, said worktable including articulating means such that when said belt sanding means is attached to said output motor drive shaft, an adjustable portion of said worktable is angularly adjustable with respect to a stationary portion of said worktable.

8. A sanding apparatus in accordance with claim 7, wherein said chassis has at least one spindle storage compartment formed therein for receiving said sanding spindle therein.

9. A sanding apparatus in accordance with claim 8, wherein said adjustable portion of said worktable is adjustable to a position in which said adjustable portion covers said spindle storage compartment.

10. A sanding apparatus, comprising:

a chassis, supporting a worktable and housing motor drive means for imparting rotational and oscillating motion to an output motor drive shaft associated with said motor drive system, said output motor drive shaft extending through an aperture in said worktable;

belt sanding means comprising a drive drum and a driven drum, said belt sanding means adapted to be attached to said output motor drive shaft such that said drive drum and said driven drum oscillate up and down and to rotate with respect to said worktable;

wherein said apparatus is convertible between a belt sanding mode of operation and a spindle sanding mode of operation, said apparatus further comprising:

spindle sanding means, adapted to be attached to said output motor drive shaft so as to oscillate up and down and to rotate and with respect to said worktable;

said sanding apparatus being operable in said spindle sanding mode when said spindle sanding means is attached to said output motor drive shaft and being operable in said belt sanding mode when said belt sanding means is attached to said output motor drive shaft.

11. A sanding apparatus, comprising:

a chassis, supporting a worktable and housing motor drive means for imparting rotational and oscillating motion to an output motor drive shaft associated with said motor drive system, said output motor drive shaft extending through an aperture in said worktable;

belt sanding means comprising a drive drum and a driven drum, said belt sanding means adapted to be attached to said output motor drive shaft such that said drive drum and said driven drum oscillate up and down and to rotate with respect to said worktable;

wherein said worktable includes articulating means such that at least a portion of said worktable is angularly adjustable with respect to said belt/pulley system, such that said apparatus is convertible between a belt sanding mode of operation in which said adjustable portion of said worktable is substantially perpendicular to a front face of said belt sanding means, and an edge sanding mode of operation in which said adjustable portion of said worktable is not substantially perpendicular to said front face;

and wherein said apparatus is further convertible between said belt sanding mode of operation and a spindle sanding mode of operation, said apparatus further comprising:

spindle sanding means, adapted to be attached to said output motor drive shaft so as to oscillate up and down and to rotate and with respect to said worktable;

said sanding apparatus being operable in said spindle sanding mode when said spindle sanding means is attached to said output motor drive shaft and being operable in said belt sanding mode when said belt sanding means is attached to said output motor drive shaft.

* * * * *